United States Patent
Jaiswal et al.

(10) Patent No.: US 12,368,673 B2
(45) Date of Patent: Jul. 22, 2025

(54) TELEMETRY-BASED CONGESTION SOURCE DETECTION

(71) Applicant: Arista Networks, Inc., Santa Clara, CA (US)

(72) Inventors: Punit Kumar Jaiswal, Karnataka (IN); Padmanabh Ratnakar, Karnataka (IN); Ashutosh Shukla, Karnataka (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 161 days.

(21) Appl. No.: 17/979,659

(22) Filed: Nov. 2, 2022

(65) Prior Publication Data

US 2024/0146655 A1 May 2, 2024

(51) Int. Cl.
*H04L 47/122* (2022.01)
*H04L 43/0882* (2022.01)
*H04L 47/11* (2022.01)

(52) U.S. Cl.
CPC ........ *H04L 47/122* (2013.01); *H04L 43/0882* (2013.01); *H04L 47/11* (2013.01)

(58) Field of Classification Search
CPC ... H04L 47/122; H04L 43/0882; H04L 47/11; H04L 43/022; H04L 43/026; H04L 43/0852; H04L 43/0876
USPC ....................................................... 709/238
See application file for complete search history.

(56) References Cited

U.S. PATENT DOCUMENTS

| | | | |
|---|---|---|---|
| 11,258,719 B1 | 2/2022 | Sommers | |
| 2005/0108444 A1* | 5/2005 | Flauaus | H04L 41/0894 710/15 |
| 2014/0201354 A1* | 7/2014 | Matthews | H04L 47/12 709/224 |
| 2016/0135079 A1* | 5/2016 | Synnergren | H04L 47/263 370/230 |
| 2018/0041470 A1* | 2/2018 | Schultz | H04L 63/0263 |
| 2018/0139215 A1* | 5/2018 | Neuvirth-Telem | G06F 21/577 |
| 2021/0084530 A1* | 3/2021 | Song | H04L 69/22 |

(Continued)

OTHER PUBLICATIONS

Song et al., In-Situ OAM Marking-based Direct Export draft-song-ippm-postcard-based-telemetry-11, Nov. 15, 2021, 12 pgs.

(Continued)

*Primary Examiner* — Adil Ocak
(74) *Attorney, Agent, or Firm* — Fountainhead Law Group, PC

(57) ABSTRACT

Systems, methods, and computer-readable media are disclosed for identifying a source of congestion in a network using postcard-based telemetry. Sampled packets from a packet flow are received by a network management collector The packet flow emanates from a host into a network ingress point of an ingress networking device. The packet flow flows through a network made up of intermediate networking devices and terminates at a network egress point. At least a portion of the one or more sampled packets is analyzed to determine whether a congestion indication has been set by a networking device. In response to determining that the congestion indication has been set a congestion notification is provided to a network administrator. The congestion notification provides an indication that the networking device has detected network congestion.

17 Claims, 5 Drawing Sheets

(56) References Cited

U.S. PATENT DOCUMENTS

2022/0060422 A1 2/2022 Sommers
2023/0396541 A1* 12/2023 Khan ..................... H04L 69/22

OTHER PUBLICATIONS

Cisco, Cisco Nexus 3000 Series NX-OS Programmability Guide, Release 9.3(x), Cisco Systems, Inc., Sep. 3, 2020, 23 pgs.
Kfoury et al., An Exhaustive Survey on P4 Programmable Data Plane Switches: Taxonomy, Applications, Challenges, and Future Trends, IEEE Access, Jun. 7, 2021, 62 pgs.

* cited by examiner

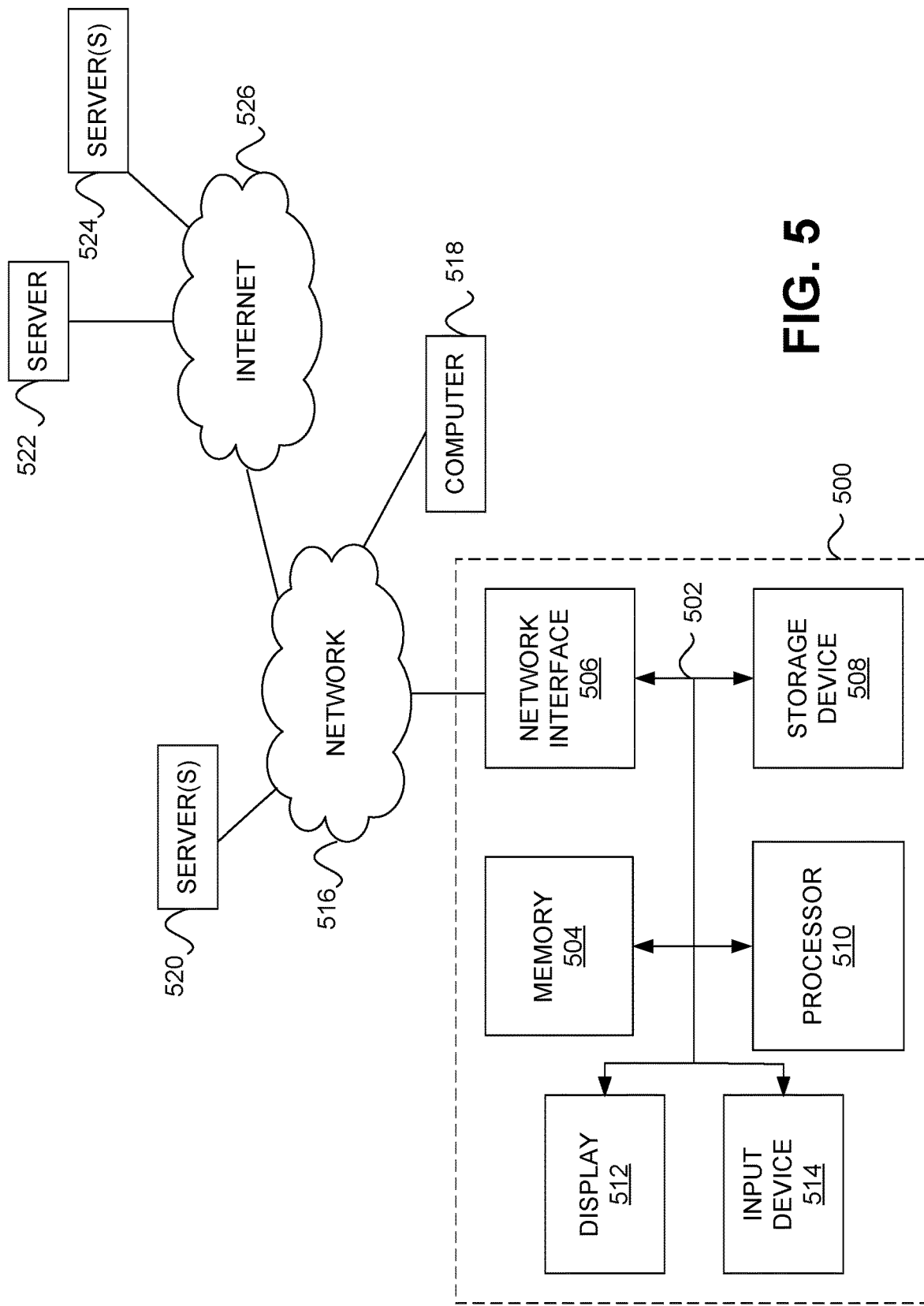

TELEMETRY-BASED CONGESTION SOURCE DETECTION

BACKGROUND

Explicit Congestion Notification (ECN) is an extension to the Internet Protocol (IP) and to the Transmission Control Protocol (TCP) that enables end-to-end notification of network congestion without dropping packets. ECN uses the two least significant bits of the Traffic Class field in the IPv4 or IPv6 header to encode four different statuses: (i) 00 denotes the situation where ECN should not be performed; (ii) 10 and 01 correspond to two different states of ECN capable transport; and (iii) 11 stands for Congestion Encountered (CE). If a host sets the CE bits to 00, the host is expressing an indication that congestion detection is not to be used. On the other hand, if the bits are set to 10 or 01, a network node, i.e., switch or router, etc., on which congestion is detected will set the bits to CE (11) to denote that congestion has been encountered. A packet with CE bits set will be forwarded to a corresponding target destination, at which point the target can send a message back to the host to slow down. However, under conventional ECN, there is no indication regarding where in a network congestion has occurred. This congestion source information is useful to have for network monitoring. Accordingly, a need exists for identifying a source of congestion in a network.

BRIEF DESCRIPTION OF THE DRAWINGS

With respect to the discussion to follow, and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 illustrates an exemplary hardware platform according to one or more embodiments.

DETAILED DESCRIPTION

Overview

Figure 1:
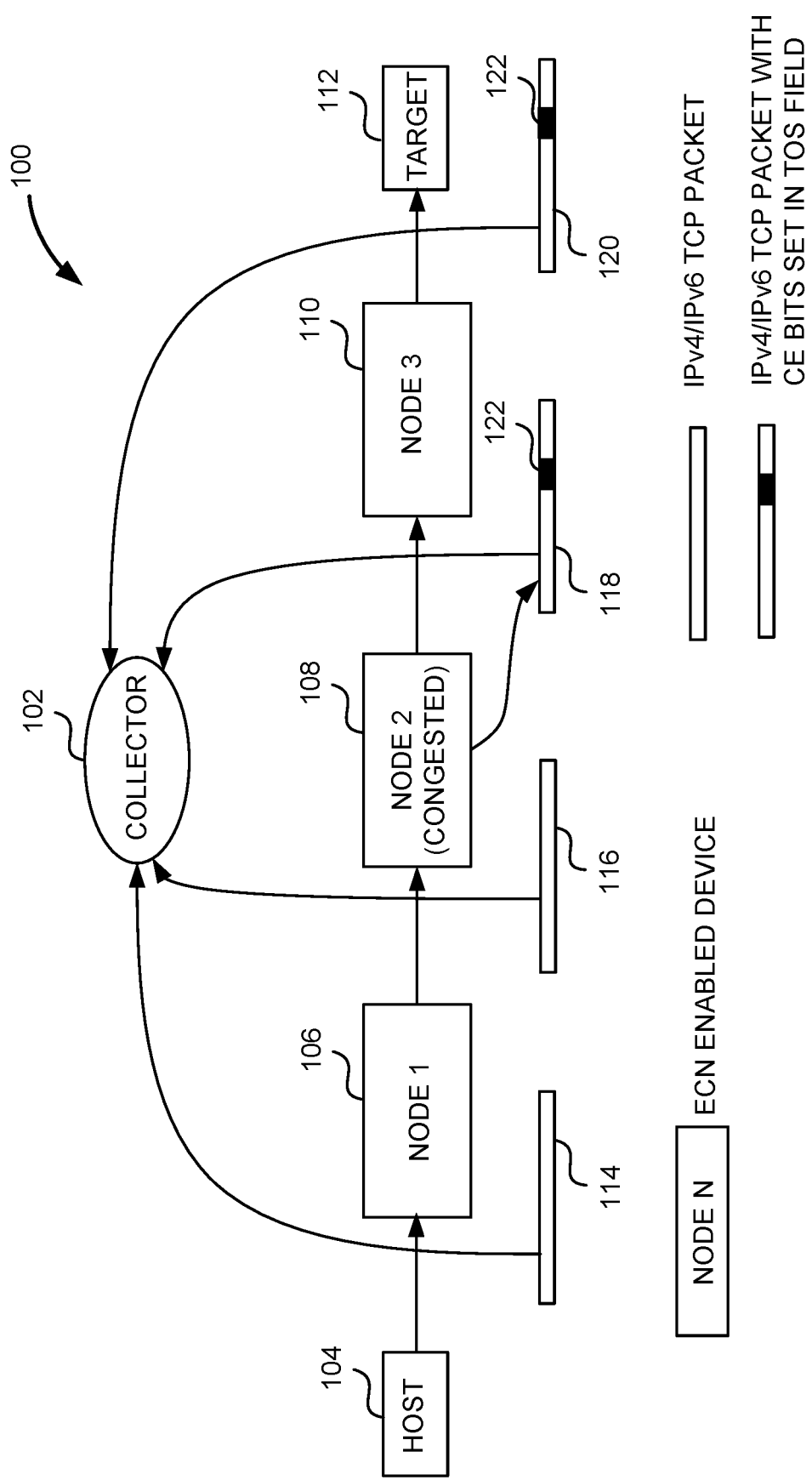
FIG. 1 illustrates an environment in which a source of congestion in a network may be identified according to one or more embodiments.

In the context of an Explicit Congestion Notification (ECN)-enabled networking environment, when a host transmits a packet into a network path via an ingress node, network nodes along the network path, i.e., switches, routers, etc., at which a source of congestion is detected may set a corresponding congestion indication (CE bits) to denote that congestion has been encountered. A packet with CE bits set will be forwarded to a corresponding target destination, at which point the target can send a message back to the host to slow down. However, under conventional ECN, there is no indication regarding where in a network congestion has occurred (i.e., the source of the congestion). This congestion source information is useful to have for network monitoring purposes. A networking device in accordance with the present teachings uses postcard-based telemetry to determine the source of ECN congestion. Postcard-based telemetry allows networking devices to directly collect and export telemetry data about any user packet at any node on a forwarding path in a network. Postcard-based telemetry generally involves inserting an instruction header to user packets to guide telemetry data collection at a networking device. Such telemetry data may include a detailed forwarding path, a timestamp/latency at each network node, and, in case of packet drop, a drop location and reason. Using postcard-based telemetry, packets are sampled at every node in the network, and at least a portion of such sampled packets are sent to a network management collector device. Upon receipt of sampled packets having a congestion indication, e.g., the CE bits set, the collector may determine which node in the network was first to discover a source of congestion, by observing the CE bits in the corresponding IP headers of the sampled packets. In some embodiments, the first 256 bytes of an IP packet are sent to the collector so that the collector can evaluate contents of the IP header. In some other embodiments, a smaller or larger portion of an IP packet is sent. In yet other embodiments, an entire IP packet is sent. In alternative embodiments, the collector need not parse an IP header to determine a congestion indication. In some such embodiments, metadata indicating congestion and an associated source may be sent alongside packet header information. With the use of such congestion source metadata, contents of the congestion-source indicating IP packet may be omitted entirely from the transmission to the collector. Congestion-source detecting mechanisms consistent with the present teachings do not use in-band telemetry technology or associated in-band telemetry-related metadata but rather postcard-based telemetry techniques to notify a collector of a source of congestion.

In some embodiments, a source of congestion is indicated by updating fields in protocol headers of the packets and sending the sampled packets to a collector over any networking protocol. In some embodiments, a Generic Routing Encapsulation (GRE) tunnel may be employed. In other embodiments, other networking protocols may be employed such as TCP, UDP or any networking protocol that can transmit information such as an IP Flow Information Export (IPFIX) protocol. The collector then processes the samples received from different nodes and determines the path followed by the packet, calculating an associated per-hop latency etc., and ultimately identifying the node which was the source of congestion. Congestion may be defined in connection with a specified per-hop latency threshold or a percentage of packet queue utilization in a particular network node.

Network Architecture

FIG. 1 illustrates an environment 100 in which a source of congestion in a network may be identified according to one or more embodiments. As depicted in FIG. 1, host 104, typically a server, such as a web server or other type of application server, initiates one or more packet flows through a network as shown in environment 100. The initiation of a packet flow from host 104 to target 112 may be initiated by a request for host 104 to serve content to target 112. The requested content may be web content, streaming content, or other information to be provided by host 104 to target 112.

Packet flows associated with content being transmitted from host 104 to target 112 pass through the network depicted in connection with environment 100 by being routed from node to node within the network. Such a network path may be optimized based on factors such as geographical proximity, available bandwidth, or other considerations such as link utilization and/or congestion. As a packet flow is directed from host 104 to an ingress node, such as node 106 ("NODE 1") to an egress node, such as node 110 ("NODE 3"), the packet may traverse one or more intermediate nodes, such as node 108 ("NODE 2"). As shown in FIG. 1, node 108 is congested meaning that it may have problems keeping up with the network flow emanating from node 106 and meant to be forwarded to node 110. In some cases, such a state of congestion may result in dropped packets, i.e., some constituent packets of the packet flow from host 104 may not make it to target 112. In these cases, protocol- and/or application-level error correction processes may be utilized to initiate retransmission of some or all of the associated packet flow. In some other cases, packets will not be dropped but portions of the underlying packet flow may be caused to be temporarily stored in memory associated with node 106 for such time as is necessary for node 106 to become "caught-up" with transmission of packets received from node 106 as well as other nodes (not shown) in the overall network. Such delayed sending of packets in the packet flow from host 104 to target 112 may result in degraded performance or packets being received out of sequence, which may result in degraded network performance, even if no packets are lost from the packet stream.

In connection with conventional ECN, intermediate nodes may set a congestion indication somewhere along the network path to indicate to target 112 that network congestion has occurred somewhere in the network. Given this information, target 112 may send an instruction to host 104 to slow down transmission. Such a slow-down, may prevent further congestion and ultimately allow the packet flow transmitted from host 104 to target 112 to continue to flow without packet loss. However, this situation may result in an unnecessarily slow connection from host 104 to target 112.

In connection with the present teachings, when packets are received at an ingress port of a network node such as node 106, node 108, and node 110, at least a portion of the received packets (or a digest thereof) may be summarized and transmitted to collector 102 in connection with postcard-based telemetry techniques. For example, when node 106, in this case an ingress node, receives an arbitrary packet (packet 114) from host 104, contents of packet 114 may be sampled and statistics about the packet calculated. In some embodiments, additional information regarding the state of node 106 may be captured and recorded with an associated time stamp contemporaneously with receipt of packet 114. At least a portion of packet 114 and optionally state information regarding node 106 may be transmitted to collector 102.

Network nodes employing postcard-based telemetry in this way, may employ techniques to consistently sample packets of the packet flow along the path traversed by the packets from host 104 to target 112. Corresponding network nodes may sample packets on ingress, create a copy of at least a portion of the sampled packets, attach postcard-based telemetry information to the copy and send the copy along with the associated statistical information to collector 102 for analysis. Sampling the same packet at each node in a path from host to target has several benefits and can be accomplished in at least two ways. A first way to accomplish same-packet sampling is to sample at the ingress edge of a domain and 'mark' the original packet. Nodes in the network path can identify the same packet by observing a 'marker' in the packet, rather than performing a random sampling. The 'marked' packets are then augmented with telemetry information and sent to the collector described in above. Another way to accomplish same-packet sampling is to match on specific bits in the packet. At every node, all packets for which a predefined set of bits match a predefined pattern are selected for postcard-based telemetry. Since the same criteria is applied on all incoming packets at every node, the same set of packets will be selected at every node for postcard-based telemetry. For the specific-bits approach to function correctly, the identified "unique set of bits" selected would need to be invariable in the packet path. The unique set of bits may be obtained by selecting a TCP checksum or the TCP sequence number. A unique hash may also be computed over the entire packet to obtain a set of unique bits.

In this way, postcard-telemetry-relevant packets are transmitted along the course between nodes. First, packet 114 is received at node 106, where it is identified, sampled, and optionally augmented with statistics regarding the state of node 106. Next, at least a portion of packet 114 is transmitted to collector 102. Such transmission of packet 114 may be accomplished by any number of in-band and/or out of band network technologies. When packet 114 passes through node 106 and reaches node 108, packet 114 is referred to as packet 116. Packet 116 has the same content, i.e., payload, to packet 114 but is transmitted from node 106 to node 108. Next, packet 116 is identified and sampled from its underlying packet flow at an ingress port of node 108, which node in the illustrated example packet flow is experiencing a congested condition. Congestion at node 108 may take any number of forms, such as near overflow conditions in one or more buffers associated with node 108 which may be caused by a state of node 108 receiving incoming packet flows at a rate that exceeds a capacity of node 108 to transmit outwardly one or more corresponding packet flows. In some embodiments, statistics regarding the internal state of various components of node 108 are compiled and/or summarized. In some such embodiments, such state information may be included in at least a portion of packet 116, which is identified, and sampled for provision to collector 102.

Next, at least a portion of packet 116 (and optional state information) may be transmitted to collector 102. In some embodiments, before packet 118 is transmitted to node 100, a congestion indication 122 is written into a portion of packet 118. When packet 118 is ultimately transmitted to target 112 in the form of output packet 120, it may contain a corresponding congestion indication 122, which communicates to target 112 that congestion has occurred between the time a corresponding packet was transmitted from host 104 and a corresponding packet being received at target 112. In some embodiments, egress networking device (in this case node 110) may send at least a portion of packet 120 to collector 102. This egress transmission may provide an indication to collector 102 that a packet has exited an egress port to a destination, which destination in this case is target 112. Since a packet with an ECN congestion indication has been transmitted to target 112, it may be anticipated that target 112 per the ECN standard will notify host 104 to slow down packet flow transmission. Such a slowdown may remedy the congestion condition at node 108, however other solutions may be preferable as in general a slowdown may result in a degradation of performance associated with an application that is consuming information associated with the slowed-down packet flow.

Instead of relying on a standards-based slow down initiated by target 112 upon receiving packet 120 containing an ECN congestion indication, collector 102 may be able to analyze incoming postcard-based telemetry information associated with at least packet 118 to determine that congestion has originated at node 108. Alternative to slowing down packet flows emanating from host 104 to target 112, various other network management techniques may be employed to mitigate congestion at node 108. For example, to the extent node 108 employs resources, such as volatile memory buffers that may be dynamically resized according to demand, such resources may be increased to increase performance of node 108 and potentially ameliorate any network congestion caused by node 108. Alternatively, to the extent that the network employs dormant redundant connections, such dormant connections could be deployed or (redeployed) to increase bandwidth in the part of the network experiencing congestion. It is understood that yet additional mechanisms may be deployed to ameliorate congestion at node 108, including for example re-routing other network flows to other parts of the network (or parallel) networks to reduce network load on node 108. When such actions are taken to remove congestion at node 108, it may be possible to increase the speed of transmission of the packet flow once again from host 104 to target 112. In some scenarios, collector 102 may notify one or both of host 104 and target 112 to let them know that congestion has been relieved and a higher transmission speed may be attempted. In some other scenarios, it is not necessary for collector 102 to inform either or both of host 104 and target 112 that congestion has been relieved. In some such scenarios, elimination of congestion will cause subsequently sampled packets of the category of packet 118 to be transmitted from node 108 to node 110 without bearing an ECN congestion indication. Such a condition would similarly result in packets similarly situated to packet 120 to be received at target 112 without ECN congestion indication 122 being present in the subsequently received packets. Where no ECN congestion indication is present, target 112 may message host 104 to increase transmission speeds.

Example Methods

Figure 2:
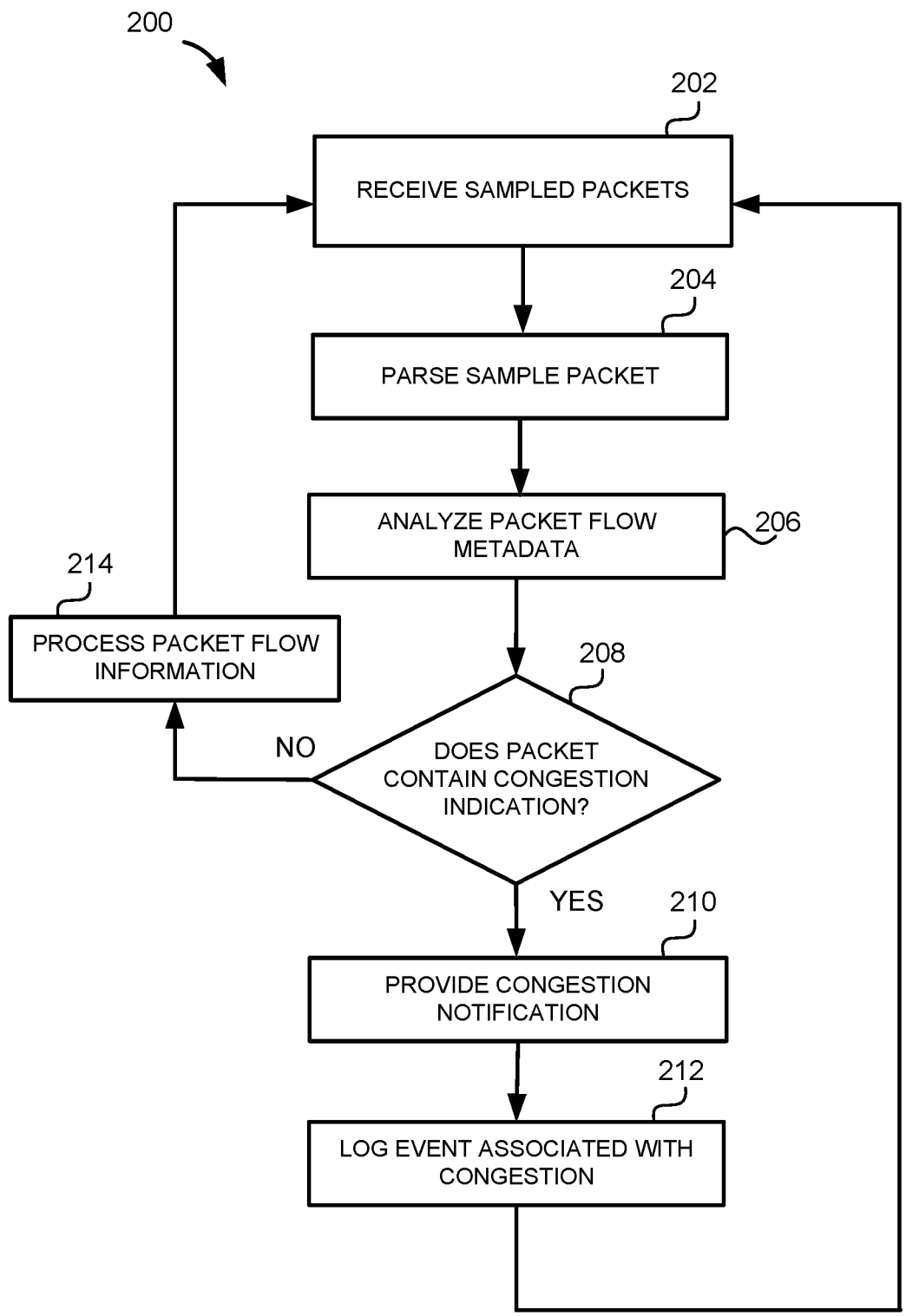
FIG. 2 illustrates an example method for identifying a source of congestion according to one or more embodiments.

FIG. 2 illustrates an example method 200 for identifying a source of congestion in a network, according to one or more embodiments. In some embodiments, a computer-implemented method is provided for identifying a source of congestion in a network by observing postcard-based telemetry data as obtained by various networking devices and forwarded to a collector in order to identify a source of congestion. The postcard-based telemetry packets (or metadata derived therefrom) may be directed to a network management collector (102 in FIG. 1) that is configured to receive telemetry information from individual networking devices as shown in FIG. 1. Such derived metadata may comprise one or more data segments containing information regarding packet flow. At step 202, at least a portion of one or more sampled packets is received from one or more networking devices (e.g., nodes 106, 108, 110 etc.) by a network management collector from a packet flow flowing through a networking device. The packet flow emanates from a host into a network ingress point, the network ingress point being associated with an ingress networking device. The packet flow terminates at a network egress point that may be associated with an egress networking device. The egress networking device may be in communication with one or more target systems. The networking device may be one of a plurality of networking devices in the network forwarding the flow of packets from the ingress networking device to the egress networking device. In some embodiments, the portion of the one or more sampled packets from the packet flow may be transmitted to the network management collector using postcard-based telemetry. At step 204, the network management collector parses packet metadata associated with the one or more sampled packets to extract from the one or more sampled packets information associated with a potential source of network congestion. Such packet metadata may be postcard-based telemetry parameters such as a detailed forwarding path, a timestamp/latency at each network node, and, in case of packet drop, the drop location and reason for dropping one or more packets. In some embodiments, the network management collector may detect congestion source indication information itself by calculating latency metrics if, for example, only ingress timestamps available from the sample packet(s).

At step 206, the network management collector analyzes at least a portion of packet flow metadata associated with performance of one or more network packet flows. In some such embodiments, an associated networking device may detect network congestion based on a per-hop latency value, which may be derived using an ingress time stamp associated with packets from an immediately prior networking device and a networking device that has received the packets from the immediately prior networking device. This difference in time stamps provides a per-hop latency from the immediately prior device. A network management collector may keep a baseline of per-hop latency numbers and whenever there is a change, such a change may indicate a source of network congestion.

In some other embodiments, the networking device may detect network congestion based on a utilization percentage of packet queue depth in a packet queue associated with the networking device. An example threshold utilization percentage such as, 50% or 80%, etc., may be identified as congestion as part of ECN configuration. The threshold can be based on a maximum latency acceptable to applications in the network, dependent on the queue depth.

At test, 208, it is determined whether the one or more sampled packets contains a network congestion indication. In some embodiments, a network congestion indication may be a bit in a header of a postcard-based telemetry packet. In some such embodiments, this indication may correspond to an ECN bit. In these embodiments, novel mechanisms consistent with the present teachings may employ setting of an ECN bit to specifically identify a networking device that is a source of congestion. In response to determining that the network congestion indication is present in at least a portion of the one or more sampled packets, execution proceeds to step 210. In response to determining that the one or more sampled packets does not contain a network congestion indication, processing continues at optional step 214 at which point packet flow information associated with the one or more sampled packets is processed to aggregate statistical information regarding the packet flow and other telemetry information associated with a portion of the network through which the one or more sampled packets has traversed.

Returning to step 210, where it has been determined that a network congestion indication is present in the one or more sampled packets, in some embodiments, the congestion indication may be provided by setting a value in a portion of a packet header. At step 210, the network management collector may provide a congestion notification to a network administrator, the congestion notification identifying a specific detecting networking device as having detected network congestion in the network. And, at step 212 in some embodiments, the network management collector may log an event associated with the detected network congestion event. The logged event may enable a network administrator to take corrective action to relieve network congestion, such as increasing bandwidth in particular networking paths or changing (rerouting) network routes to redirect traffic flows. In some embodiments, the portion of the one or more sampled packets may be received by the network management collector by way of a Generic Routing Encapsulation (GRE) tunnel. In some embodiments, a machine learning model may be trained, based on repeated network congestion events, to predict future network congestion events and to proactively take corrective action to avoid a subsequent occurrence of a similar network congestion event.

Figure 3:
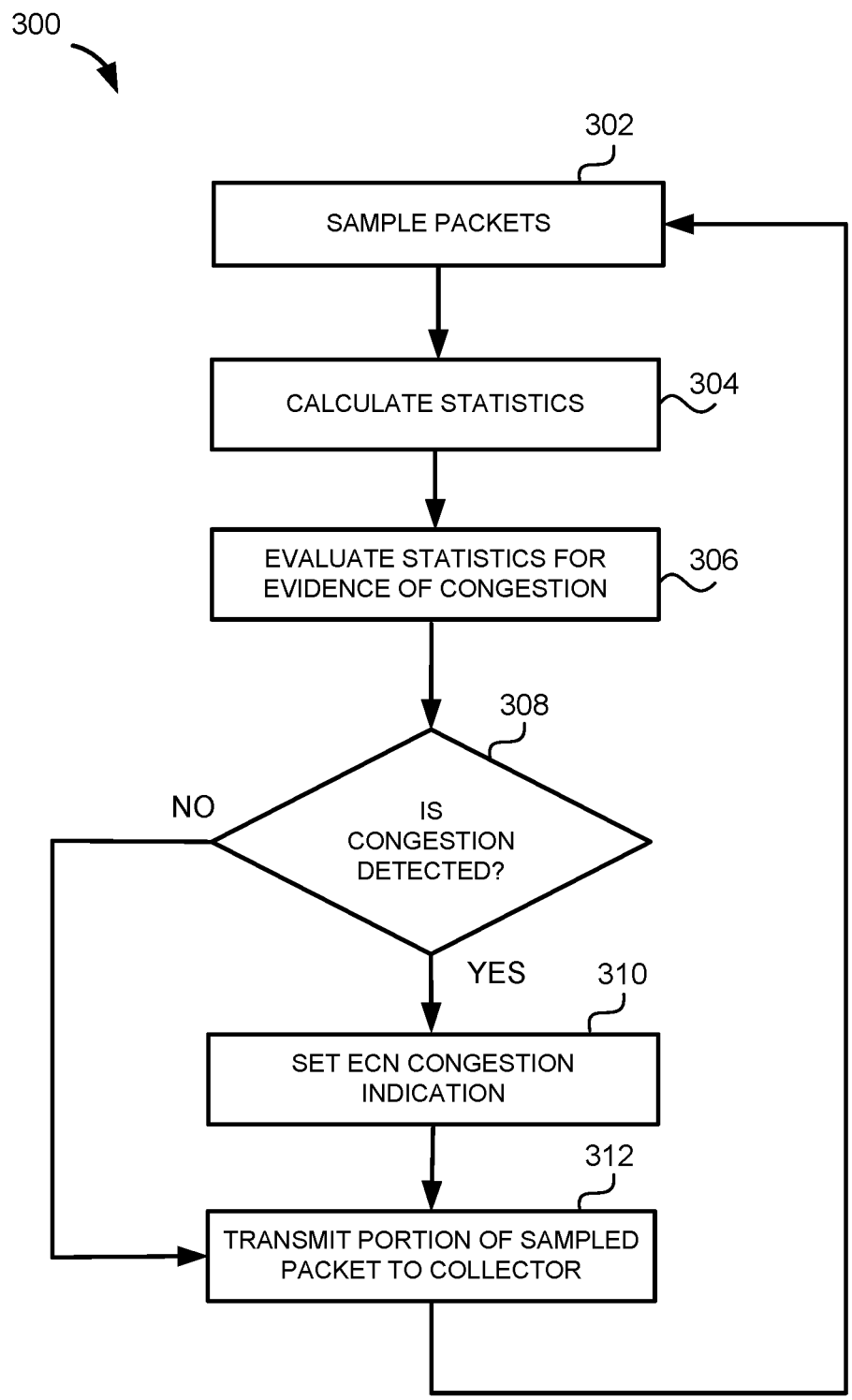
FIG. 3 illustrates an example method for reporting a source of congestion according to one or more embodiments.

FIG. 3 illustrates an example method 300 for reporting a source of congestion according to one or more embodiments. In some embodiments, a computer-implemented method is provided in connection with various physical networking devices, such as nodes 106, 108, and 110 of FIG. 1. Physical structures such as nodes 106, 108, and 110 of FIG. 1 may collect metadata associated with packet flows flowing through nodes 106, 108, and 110. Network flow metadata may be obtained by various such networking devices and forwarded to a collector in order to identify one or more sources of congestion. Associated postcard-based telemetry packets (or metadata derived therefrom) may be then directed to a network management collector (102 in FIG. 1) that is configured to receive telemetry information from individual networking devices as shown in FIG. 1 for identifying a source of congestion in a network by observing postcard-based telemetry data as obtained by various networking devices and forwarded to a collector. At step 302, one or more packets are sampled at a congestion-detecting networking device. The one or more sampled packets are sampled from a packet flow flowing through the congestion-detecting networking device. The packet flow emanates from a host into a network ingress point, the network ingress point being associated with an ingress networking device. The packet flow terminates at a network egress point that may be associated with an egress networking device. The egress networking device may be in communication with one or more target systems. The networking device may be one of a plurality of networking devices in the network forwarding the flow of packets from the ingress networking device to the egress networking device.

Next, at step 304, the congestion-detecting networking device calculates statistics regarding the one or more sampled packets. These statistics may relate to telemetry parameters such as those described in connection with postcard-based telemetry metadata parameters. At step 306, the calculated statistics may be evaluated to derive a congestion indication based on evidence of network congestion. Such calculated statistics may include statistics such as per hop latency and dropped packets, as well as other statistics regarding the one or more network flows. If based on the evidence of network congestion at test 308, it is determined that network congestion exceeds a configurable threshold, at step 310 such evidence of network congestion may result in an ECN indicator being set in a packet header associated with the one or more sampled packets. In some such embodiments, the networking device may detect network congestion based on a per-hop latency value associated with a network hop between the networking device and an immediately prior networking device in a path defined by the plurality of networking devices forwarding the flow of packets from the ingress networking device to the egress networking device. In some other embodiments, the networking device may detect network congestion based on a utilization percentage of packet queue depth in a packet queue associated with the networking device. If at test 308, it is determined that network congestion does not exceed a configurable threshold, an ECN indication may not be set and execution skips step 310 and proceeds to step 312.

At step 312, the congestion-detecting networking device may transmit at least a portion of one or more sampled packets to a network management collector. As described in connection with FIG. 2, the portion of the one or more sampled packets from the packet flow may be transmitted to the network management collector using postcard-based telemetry. Finally, execution continues back to step 302 and packet sampling resumes within one or more networking devices.

Example Networking Device

Figure 4:
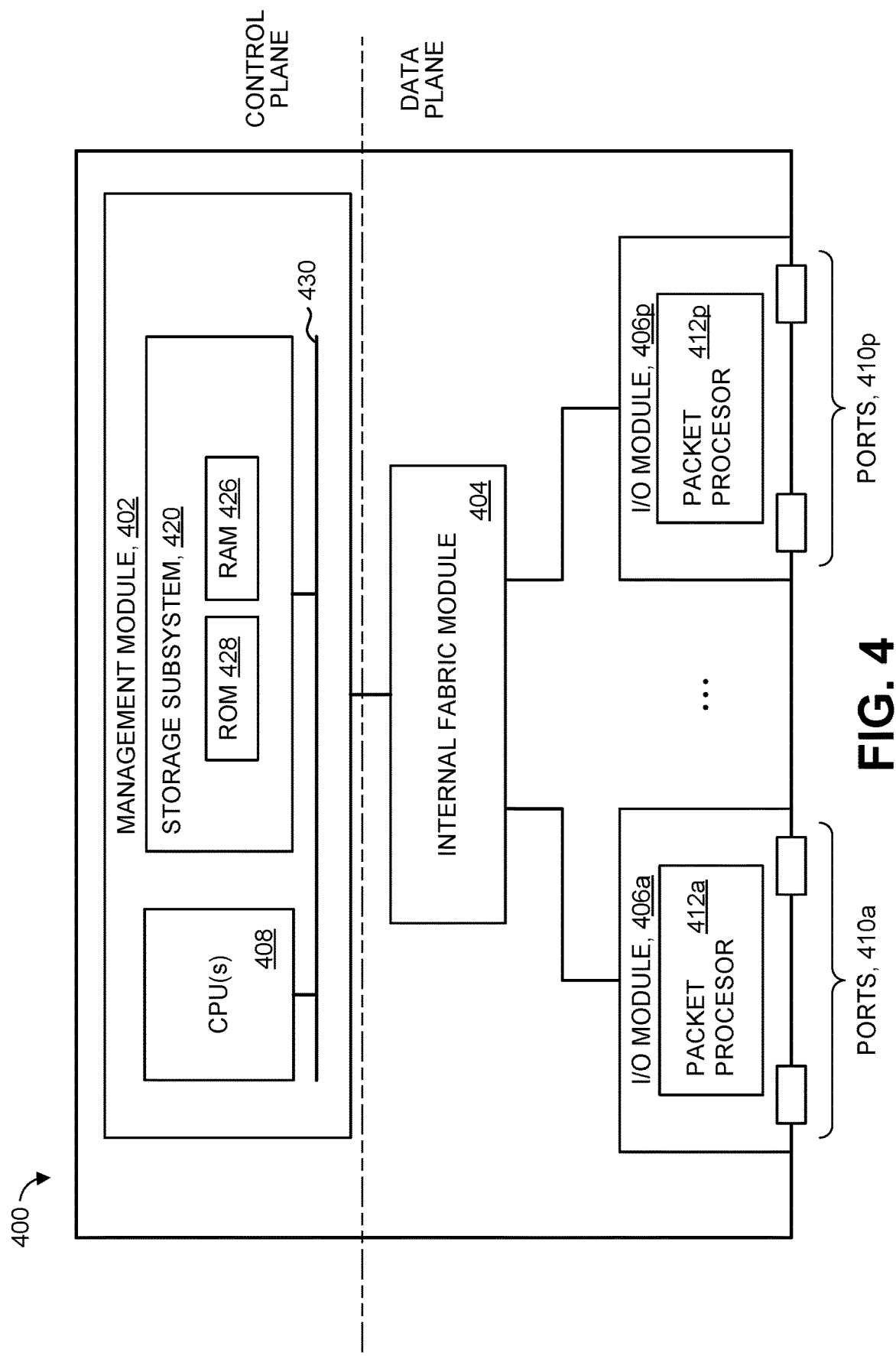
FIG. 4 illustrates an example of a networking device that can be adapted in accordance with one or more embodiments.

FIG. 4 illustrates an example networking device 400 that can be adapted in accordance with some embodiments of the present disclosure, networking device 400 may be a switch or a router, for example. In some other embodiments, networking device 400 may be a network management collector device. As shown, networking device 400 may include management module 402, internal fabric module 404, and a number of I/O modules 406a-406p. Management module 402 may be disposed of in a control plane (also referred to as control layer) of the networking device 400 and can include one or more management CPUs 408 for managing and controlling operation of networking device 400 in accordance with the present disclosure. management CPU(s) 408 may be general-purpose processors, such as an Intel®/AMD® x86-64 or ARM® processor, that operates under the control of software stored in a memory, such as storage subsystem 420, which may include read-only memory (ROM) 428 and/or random-access memory (RAM) 426. The control plane refers to all the functions and processes that determine which path to use, such as routing protocols, spanning tree, and the like.

Internal fabric module 404 and I/O modules 406a-406p collectively represent a data plane of networking device 400 (also referred to as data layer, forwarding plane, etc.). Internal fabric module 404 is configured to interconnect the various other modules of networking device 400. Each I/O module 406a-406p includes one or more input/output ports 410a-410p that are used by networking device 400 to send and receive network packets. Each I/O module 406a-406p can also include a packet processor 412a-412p. Each packet processor 412a-412p may comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Example Computing Device

FIG. 5 illustrates an exemplary hardware platform such as a computing device, according to one or more embodiments. Computer 500 can be a desktop computer, a laptop computer, a server computer, a mobile device such as a smartphone or tablet, or any other form factor of general- or special-purpose computing device containing at least one processor. Such computing devices may be networking devices such as routers, switches, or other networking devices. Such computing devices may also be collectors as described above. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple buses or components that may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 are connected to system bus 502. Like display 512, these peripherals may be integrated into computer 700 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 700 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, and network storage, such as cloud network storage. Network 516 is in turn connected to public Internet 526, which connects many networks globally. In some embodiments, computer 500 can itself be directly connected to public Internet 526.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the disclosure has been described with reference to the embodiments illustrated in the attached drawing figures, it is noted that equivalents may be employed, and substitutions made herein without departing from the scope of the disclosure as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed disclosure in sufficient detail to enable those skilled in the art to practice the disclosure. Other embodiments can be utilized, and changes can be made without departing from the claimed scope of the disclosure. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Having thus described various embodiments of the disclosure, what is claimed as new and desired to be protected by Letters Patent includes the following:

The invention claimed is:

1. A computer-implemented method for identifying a source of congestion in a network, the method comprising:
   receiving, from a networking device, by a network management collector, at least a portion of one or more sampled packets from a flow of packets, the flow of packets flowing from a host to a target,
   wherein the flow of packets emanates from the host into a network ingress point, the network ingress point being associated with an ingress networking device, the flow of packets terminating at a network egress point, the network egress point being associated with an egress networking device, the egress networking device being in communication with the target, the networking device being one of a plurality of networking devices forwarding the flow of packets from the ingress networking device to the egress networking device,
   wherein the portion of the one or more sampled packets from the flow of packets is transmitted using postcard-based telemetry;
   analyzing at least a portion of a header associated with the portion of the one or more sampled packets to determine whether one or more Explicit Congestion Notification (ECN) bits have been set in the portion of the header by the networking device;
   in response to determining that the one or more ECN bits have been set in the portion of the header, providing a congestion notification to a network administrator device, the congestion notification identifying the networking device that set the one or more ECN bits in the portion of the header as being the source of congestion in the network.

2. The method of claim 1, wherein the network management collector identifies the networking device as the source of congestion based on the one or more ECN bits and one or more ingress timestamps.

3. The method of claim 1, wherein the networking device detects network congestion based on a utilization percentage of packet queue depth in a packet queue associated with the detecting networking device.

4. The method of claim 1, wherein providing the congestion notification to the network administrator further comprises logging an event associated with the congestion.

5. The method of claim 1, wherein the portion of the one or more sampled packets is received by way of a Generic Routing Encapsulation (GRE) tunnel.

6. The method of claim 1 further comprising, in addition to providing the congestion notification:
   taking, by the network management collector, one or more actions to reduce or remove congestion at the networking device.

7. The method of claim 6, wherein the one or more actions include dynamically resizing one or more buffers of the networking device.

8. The method of claim 6, wherein the one or more actions include deploying one or more dormant redundant connections within the network.

9. One or more non-transitory computer-readable media storing computer-executable instructions that, when executed by a processor, perform a method of identifying a source of congestion in a network, the method comprising:
   receiving, from a detecting networking device, by a network management collector, at least a portion of one or more sampled packets from a flow of packets, the flow of packets flowing from a host to a target,
   wherein the flow of packets emanates from the host into a network ingress point, the network ingress point being associated with an ingress networking device, the flow of packets terminating at a network egress point, the network egress point being associated with an egress networking device, the egress networking device being in communication with the target, the detecting networking device being one of a plurality of networking devices forwarding the flow of packets from the ingress networking device to the egress networking device;
   analyzing at least a portion of a header associated with the portion of the one or more sampled packets to determine whether one or more Explicit Congestion Notification (ECN) bits have been written in the portion of the header by the detecting networking device; and
   in response to determining that the one or more ECN bits have been written in the portion of the header, providing a congestion message, the congestion message identifying the detecting networking device that wrote the one or more ECN bits in the portion of the header as being the source of congestion in the network.

10. The one or more non-transitory computer-readable media of claim 9, wherein the detecting networking device has detected network congestion based on a per-hop latency value associated with a network hop between the detecting networking device and a prior networking device in a path defined by the plurality of networking devices forwarding the flow of packets from the ingress networking device to the egress networking device.

11. The one or more non-transitory computer-readable media of claim 9, wherein the detecting networking device detects network congestion based on a utilization percentage of packet queue depth in a packet queue associated with the detecting networking device.

12. The one or more non-transitory computer-readable media of claim 9, wherein providing the congestion message further comprises providing a congestion source notification to a network management device that is configured to take corrective action with respect to one or more networking devices in the network.

13. The one or more non-transitory computer-readable media of claim 9, wherein the portion of the one or more sampled packets is received by way of an IP Flow Information Export (IPFIX) protocol.

14. A system for identifying a source of congestion in a network, the system comprising:
a processor; and
one or more non-transitory computer-readable media storing computer-executable instructions that, when executed by the processor, perform a method comprising:
receiving, from a detecting networking device, by a network management collector, at least a portion of one or more sampled packets from a flow of packets, the flow of packets flowing from a host to a target,
wherein the flow of packets emanates from the host into a network ingress point, the network ingress point being associated with an ingress networking device, the flow of packets terminating at a network egress point, the network egress point being associated with an egress networking device, the egress networking device being in communication with the target, the detecting networking device being one of a plurality of networking devices forwarding the flow of packets from the ingress networking device to the egress networking device;
analyzing at least a portion of a header associated with the portion of the one or more sampled packets to determine whether one or more Explicit Congestion Notification (ECN) bits have been set in the portion of the header by the detecting networking device; and
in response to determining that the one or more ECN bits have been set in the portion of the header, providing a congestion notification to a network administrator, the congestion notification identifying the detecting networking device that set the one or more ECN bits in the portion of the header as being the source of congestion in the network.

15. The system of claim 14, wherein the detecting networking device has detected network congestion based on a per-hop latency value associated with a network hop between the detecting networking device and a prior networking device in a path defined by the plurality of networking devices forwarding the flow of packets from the ingress networking device to the egress networking device.

16. The system of claim 14, wherein the detecting networking device detects network congestion based on a utilization percentage of packet queue depth in a packet queue associated with the detecting networking device.

17. The system of claim 14, wherein providing the congestion notification further comprises rerouting one or more network flows to avoid the source of congestion.

* * * * *